(12) United States Patent
Bhutani et al.

(10) Patent No.: US 12,530,274 B2
(45) Date of Patent: Jan. 20, 2026

(54) SYSTEMS AND TECHNIQUES FOR ANALYZING RESOURCE USAGE BY APPLICATIONS OF AN ELECTRONIC DEVICE

(71) Applicant: Apple Inc., Cupertino, CA (US)

(72) Inventors: Akhil Bhutani, Hayward, CA (US); Anshul Dawra, Campbell, CA (US); Shreyas Binnamangala Prabhu, Santa Clara, CA (US); Phillip J. Azar, Oakland, CA (US); Ashish Patro, Santa Clara, CA (US); Alex W. Fu, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/404,714

(22) Filed: Jan. 4, 2024

(65) Prior Publication Data
US 2024/0427681 A1 Dec. 26, 2024

Related U.S. Application Data (60) Provisional application No. 63/522,682, filed on Jun. 22, 2023.

(51) Int. Cl.
*G06F 11/30* (2006.01)
*G06F 16/2458* (2019.01)
*G06F 16/28* (2019.01)

(52) U.S. Cl.
CPC ........ *G06F 11/3051* (2013.01); *G06F 11/302* (2013.01); *G06F 16/2468* (2019.01); *G06F 16/285* (2019.01)

(58) Field of Classification Search
CPC ............. G06F 11/3051; G06F 16/2468; G06F 16/285; G06F 11/302
See application file for complete search history.

(56) References Cited

U.S. PATENT DOCUMENTS

| 8,627,317 | B2 | 1/2014 | Altman et al. |
|---|---|---|---|
| 2018/0046562 | A1 | 2/2018 | Yu et al. |
| 2019/0260879 | A1* | 8/2019 | Raleigh ................. H04M 15/83 |
| 2019/0370141 | A1* | 12/2019 | Choi ................... G06F 11/3075 |
| 2022/0392486 | A1 | 12/2022 | Binnamangala Prabhu et al. |

OTHER PUBLICATIONS

Bhavani, amygb.ai [online], "Fuzzy Matching," Aug. 12, 2022, retrieved on Oct. 8, 2024, retrieved from URL<https://www.amygb.ai/blog/how-does-fuzzy-matching-work>, 15 pages.

* cited by examiner

*Primary Examiner* — Kannan Shanmugasundaram
(74) *Attorney, Agent, or Firm* — Fish & Richardson P.C.

(57) ABSTRACT

In an example method, a system receives diagnostic data from a plurality of electronic devices, the diagnostic data representing resource usage by applications on the plurality of electronic devices, application names associated with the applications, application version identifiers associated with the applications, and call-stacks associated with the resource usage by the applications. The system categorizes the resource usage based on the application names, the application version identifiers, and the call-stacks, including determining signatures based on the call-stacks, and categorizing the resource usage based on the signatures, the application names, and the application version identifiers. Further, the system generates a data set representing the categorization of the resource usage.

21 Claims, 8 Drawing Sheets

SYSTEMS AND TECHNIQUES FOR ANALYZING RESOURCE USAGE BY APPLICATIONS OF AN ELECTRONIC DEVICE

CROSS-REFERENCE TO RELATED APPLICATION

This application claims priority to U.S. Provisional Patent Application No. 63/522,682, filed Jun. 22, 2023, the entire contents of which are incorporated herein by reference.

TECHNICAL FIELD

The disclosure relates to systems and methods for analyzing resource usage by applications of an electronic device.

BACKGROUND

In general, an electronic device can execute one or more applications to perform particular tasks. As an example, an electronic device can execute an email application to enable a user to send and/or receive emails. As another example, an electronic device can execute a chat application to enable a user to send and/or receive chat messages. As another example, an electronic device can execute a web browser application to enable a user to retrieve, view, and/or interact with webpages.

Further, each application may consume resources provided by the electronic device during operation. As an example, each application may write data to one or more data storage devices of the electronic device. As another example, each application may utilize one or more processors and/or memory of the electronic device. As another example, each application may utilize electric power available to the electronic device (e.g., via an internal power source, such as a battery, and/or an external power source). As another example, each application may experience an execution failure (e.g., a "crash") during operation.

SUMMARY

In general, a computer system can be configured to analyze resource usage by applications of an electronic device.

For instance, the computer system can receive diagnostic data from one or more electronic devices. The diagnostic data includes information regarding the operation of each of the electronic devices, including the execution of one or more applications by the electronic devices and the resources consumed by those applications during operation. As an example, the diagnostic data can include, for each of the electronic devices, information regarding (i) resource usage by one or more applications on that electronic device, (ii) application names and version identifiers associated with the one or more applications (e.g., application version numbers), and (iii) one or more call-stacks associated with the resource usage by the one or more applications.

Further, the computer system can categorize the resource usage based on one or more dimensions of information. For example, the computer system can determine one or more signatures based on the one or more call-stacks, and categorize the resource usage based on the one or more signatures and the application version identifiers.

Further, the computer system can generate a data set representing the categorization of the resource usage, and present at least a portion of the data set to the user (e.g., via a user interface).

The implementations described in this disclosure can provide various technical benefits. For instance, in some implementations, the systems and techniques described herein can be performed to improve the performance of each of the applications that are executed on the electronic device and/or the performance of the electronic device itself. For example, in at least some implementations, these systems and techniques can be configured to categorize resource usage based on at least (i) the portions of the call-path (e.g., call-paths) associated with the resource usage, (ii) the names of the application associated with that resource usage, and (iii) the application version identifier (e.g., application version number) of the application associated with that resource usage. This enables users to better understand differences in the performance of an application across different versions of the application, and to identify specific portions of the call-stacks and/or call-paths of the application that are associated with those differences. Further, these system and techniques can enable a user to readily perceive the changes that caused the regression, and effectively diagnose and fix the regression in future versions of the applications. Further still, these systems and techniques can also assist users (e.g. developers of the application) to pinpoint the version identifier where the regression was initially introduced.

In particular, in some implementations, the systems and techniques described herein enable users to identify regressions between versions of an application (e.g., an unintended and/or undesired change in functionality or performance of the application between versions). For example, these techniques can identify an increase in disk writing, processor utilization, memory utilization, electrical power utilization, and/or execution failures by an application from one version to another, and identify the specific portions of the call-stacks and/or call-paths of the application that are associated with those increases. This enables a user (e.g., a developer of the application) to diagnose and correct the regression in future versions of the application. Accordingly, the application can run more effectively and/or efficiently, thereby improving the performance of the electronic device.

In an aspect, a method includes: receiving, by a computer system, diagnostic data from a plurality of electronic devices, where the diagnostic data represents: resource usage by one or more applications on the plurality of electronic devices, one or more application names associated with the one or more applications, one or more application version identifiers associated with the one or more applications, and one or more call-stacks associated with the resource usage by the one or more applications; and categorizing, by the computer system, the resource usage based on the one or more application names, the one or more application version identifiers, and the one or more call-stacks, where categorizing the resource usage includes: determining one or more signatures based on the one or more call-stacks, and categorizing the resource usage based on the one or more signatures, the one or more application names, and the one or more application version identifiers; and generating, by the computer system, a data set representing the categorization of the resource usage.

Implementations of this aspect can include one or more of the following features In some implementations, categorizing the resource usage can further include: determining one or more call-paths based on the one or more call-stacks, and determining the one or more signatures based on the one or more call-paths.

In some implementations, the resource usage can include writing data to a storage device on each of the plurality of electronic devices.

In some implementations, the resource usage can include utilization of one or more processors on each of the plurality of electronic devices.

In some implementations, the resource usage can include utilization of computer memory on each of the plurality of electronic devices.

In some implementations, the resource usage can include utilization of electrical power by each of the plurality of electronic devices.

In some implementations, the resource usage can include an execution failure by the one or more applications on the plurality of electronic devices.

In some implementations, categorizing the resource usage can include: determining a plurality of call-paths based on the one or more call-stacks, determining a plurality of signatures based on the one or more call-paths, performing semantic matching with respect to the plurality of signatures, and categorizing the resource usage based on the semantically matched signatures.

In some implementations, performing semantic matching with respect to the plurality of signatures can include: removing one or more portions of the plurality of signatures, where the one or more portions of the signature represent syntax added to the plurality of call-paths by a compiler during a compilation of the one or more applications, and subsequent to removing the syntax, determining a similarity among the signatures.

In some implementations, performing semantic matching with respect to the plurality of signatures can further include: upon determining a similarity between a first signature and a second signature, merging the first signature and the second signature.

In some implementations, the syntax can be associated with a name mangling process by the compiler.

In some implementations, categorizing the resource usage can include: determining a plurality of call-based on in the one or more call-stacks, determining a plurality of signatures based on the one or more call-paths, performing fuzzy matching with respect to the plurality of signatures, and categorizing the resource usage based on the fuzzy matched signatures.

In some implementations, performing fuzzy matching with respect to the plurality of signatures can include: determining one or more differences between a first signature and a second signature, determining whether the one or more differences satisfy one or more criteria, where the one or more criteria includes at least one of: a first criteria that the one or more differences represent an unsymbolicated frame associated with at least one of the first signature or the second signature, a second criteria that the one or more differences represent a variation in compilation name mangling associated with the first signature and the second signature, a third criteria that the one or more differences represent a difference in data type of one or more parameters of the first signature and the second signature, a fourth criteria that the one or more differences represent an indirection in computer code associated with at least one of the first signature and the second signature, or a fifth criteria that the one or more differences represent a refactoring of computer code associated with at least one of the first signature and the second signature; and determining a similarity metric for the first signature and the second signature based on at least one of the one or more criteria.

In some implementations, performing fuzzy matching with respect to the plurality of signatures further can include: upon determining the similarity metric satisfies a similarity threshold, merging the first signature and the second signature.

In some implementations, the diagnostic data can include a plurality of logs received from plurality of electronic devices. Each of the logs can include one or more samples regarding the resource usage of the one or more applications on the plurality of electronic devices. Further, categorizing the resource usage can include, for each category of resource usage, determining a weight for that category based on: a number of samples in the diagnostic data that are associated with the signature of that category, and a number of diagnostic logs having the signature of that category.

In some implementations, the diagnostic data can include a plurality of logs received from plurality of electronic devices. Each of the logs can include one or more samples regarding the resource usage of the one or more applications on the plurality of electronic devices. Further, categorizing the resource usage can include, for each category of resource usage, determining a weight for that category based on: a number of diagnostic logs having the signature of that category, and a total number of diagnostic logs.

In some implementations, the method can also include presenting at least a portion of the data set representing the categorization of the resource usage to a user.

In some implementations, presenting at least the portion of the data set representing the categorization of the resource usage to the user can include presenting a user interface to the user. The user interface can include a plurality of user interface elements, where each of the user interface element represents a respective portion of resource usage associated with a respective one of the signatures and a respective one of the one or more application version identifiers.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

DETAILED DESCRIPTION

Figure 1:
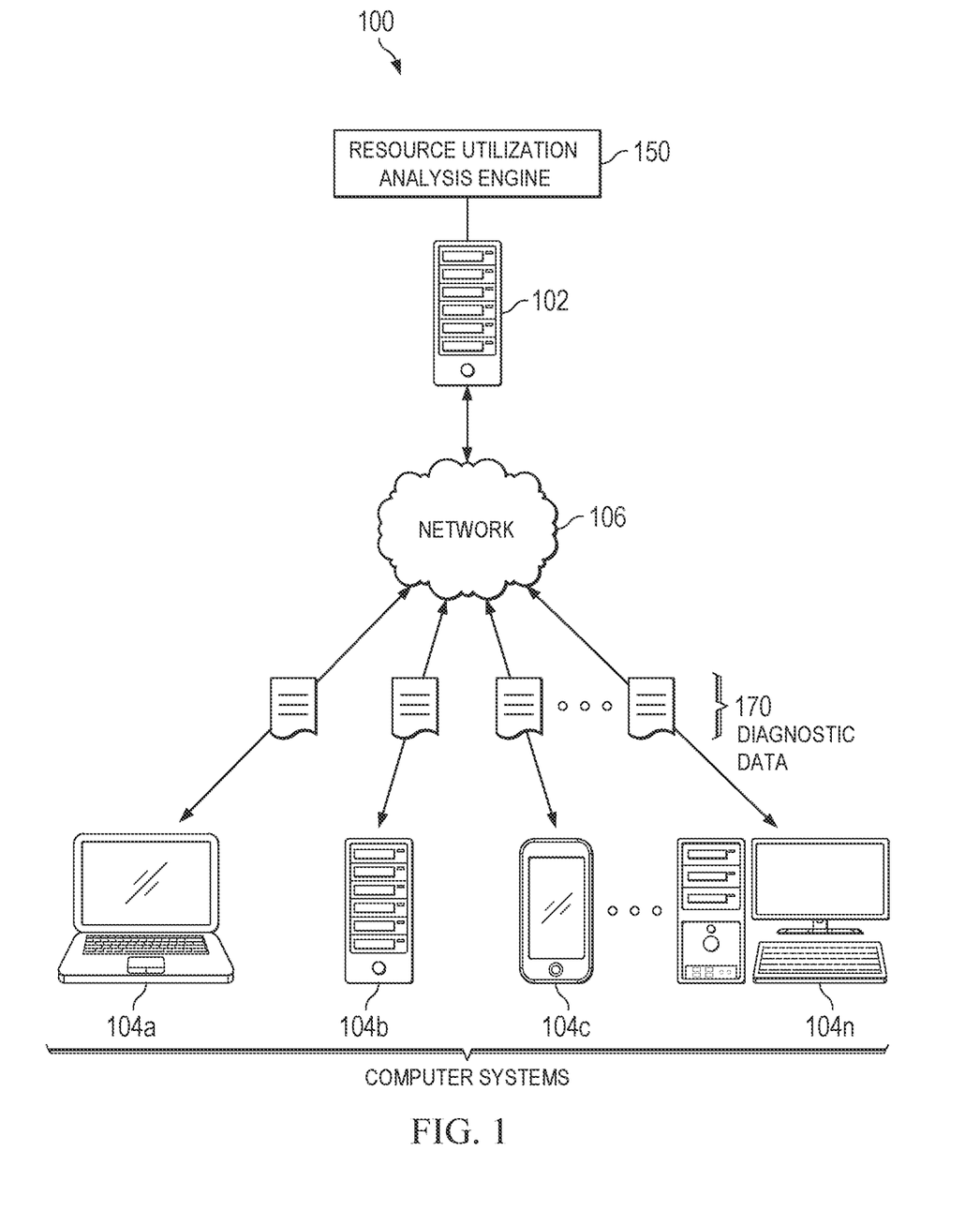
FIG. 1 is a diagram of an example system for analyzing resource usage by applications of an electronic device.

FIG. 1 shows an example system 100 for analyzing resource usage by one or more electronic devices 104-104n.

The system 100 includes a resource utilization analysis engine 150 maintained on a computer system 102.

During an example operation of the system 100, the resource utilization analysis engine 150 receives diagnostic data 160 from the electronic devices 104a-104n via a network 106. In general, the diagnostic data 160 includes information regarding the operation of each of the electronic devices 104a-104n, including the execution of one or more applications by the electronic devices 104a-104n and the resources consumed by those applications during operation.

For instance, the diagnostic data 170 can include, for each of the electronic devices 104a-104n, information regarding the resource usage by one or more applications on that electronic device 104a-104n.

As an example, the diagnostic data 170 can include information regarding the writing of data to one or more storage devices of the electronic device 104a-104n (e.g., "disk writes"). For instance, the diagnostic data 170 can include information indicating that a particular amount of data was written at a particular time or time interval.

As another example, the diagnostic data 170 can include information regarding the utilization of one or more processors of the electronic device 104a-104n. For instance, the diagnostic data 170 can include information indicating that a particular degree of processor utilization was measured at a particular time or time interval.

As another example, the diagnostic data 170 can include information regarding the utilization of memory of the electronic device 104a-104n. For instance, the diagnostic data 170 can include information indicating that a particular degree of memory utilization was measured at a particular time or time interval.

As another example, the diagnostic data 170 can include information regarding the utilization of electrical power available to the electronic device 104a-104n, such as electrical power provided via an internal power source (e.g., a battery) and/or an external power source. For instance, the diagnostic data 170 can include information indicating that a particular degree of power electrical utilization was measured at a particular time or time interval.

As another example, the diagnostic data 170 can include information regarding execution failures (e.g., "crashes") experienced by one or more applications of the electronic device 104a-104n. For instance, the diagnostic data 170 can include information indicating that a particular execution failure occurred at a particular time.

In some implementations, the diagnostic data 170 can include several diagnostic logs (e.g., discrete portions of diagnostic data), each having one more samples (e.g., measurement samples) regarding the resource usage of one or more applications on an electronic device.

In some implementations, the resource utilization analysis engine 150 can retrieve the diagnostic data 170 from the computer system 104a-104n continuously, periodically, or intermittently (e.g., upon the users of the computer system 104a-104n consenting to providing such information).

Further, the resource utilization analysis engine 150 can categorize the resource usage by the electronic devices 104a-104n based on one or more dimensions of information. For example, the resource utilization analysis engine 150 can determine one or more signatures based on the one or more call-stacks, and categorize the resource usage based on the one or more signatures, application names, and the application version identifiers. In some implementations, these signatures may also be referred to as "call-path signatures."

For example, the resource utilization analysis engine 150 can categorize resource usage based on at least (i) the portions of the call-path (e.g., call-paths) associated with the resource usage, (ii) the names of the application associated with that resource usage, and (iii) the application version identifier (e.g., application version number) of the application associated with that resource usage. This enables users to better understand differences in the performance of an application across different versions of the application, and to identify specific portions of the call-stacks and/or call-paths of the application that are associated with those differences.

Further, the resource utilization analysis engine 150 can generate a data set representing the categorization of the resource usage, and present at least a portion of the data set to the user (e.g., via a user interface).

Figure 2:
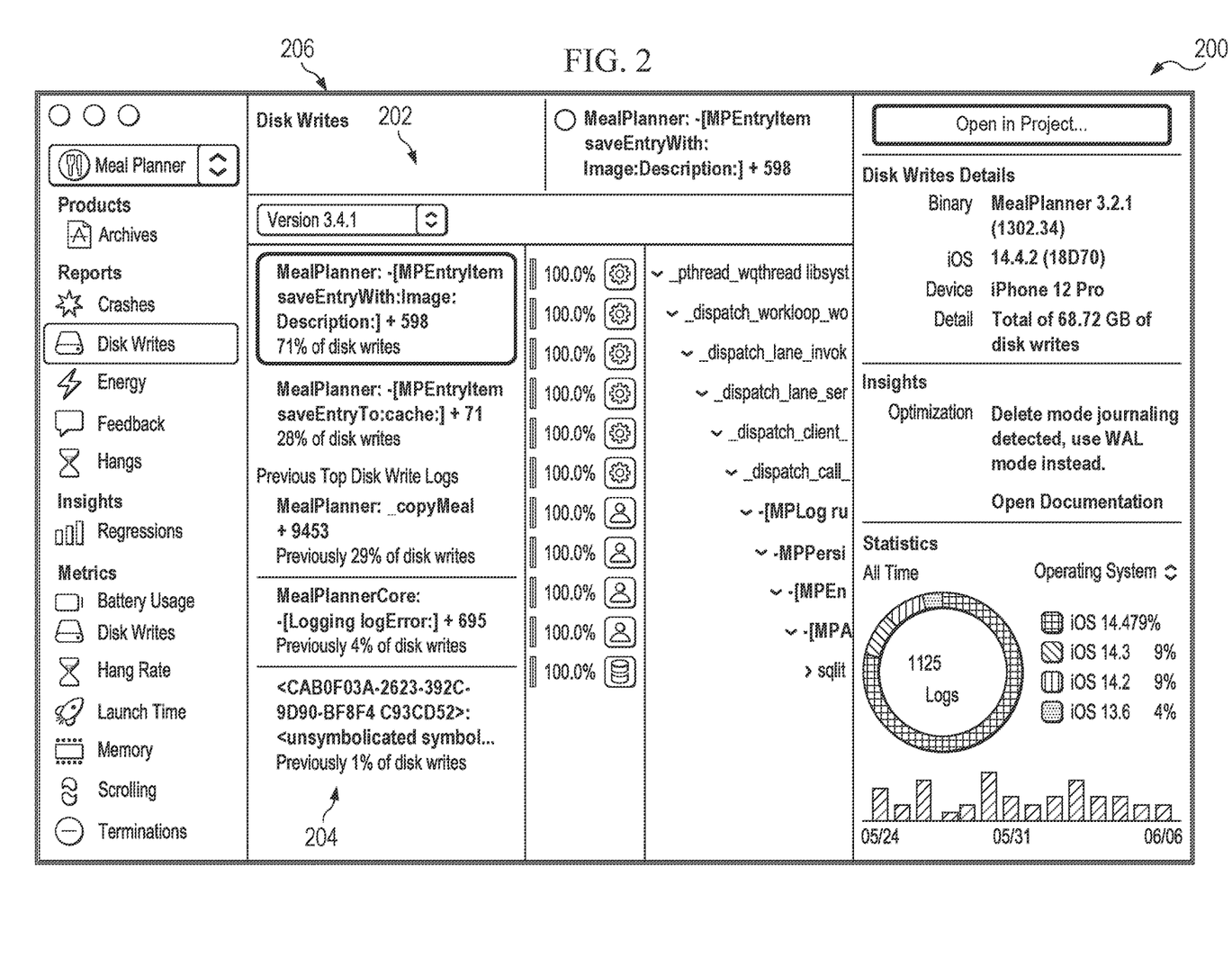
FIG. 2 shows an example user interface for presenting categories resource usage data to a user.

To illustrate, FIG. 2 shows a simplified example user interface 200 for presenting categorized resource usage data to a user. The user interface 200 includes several user interface elements representing resource usage by applications of the electronic devices 104a-104n (e.g., writing of data to storage devices and/or any other type of resource usage) based on different categories of signatures, application names, and/or application version identifiers.

For example, the user interface 200 includes a user interface element 202 identifying several signatures associated with a particular version of an application (e.g., version 3.4.1. of a "MealPlanner" application), and the disk writes associated with those signatures. Further, the user interface 200 also includes a user interface element 204 identifying signatures previously associated with high disk writes (e.g., in previously received diagnostic data or logs). Further, the user interface 200 also includes a user interface element 206 displaying further diagnostic information regarding a selected signature from the user elements 202 and 204 (e.g., diagnostic logs, disk write details, insights, statistics, etc.).

In general, a call-stack is a stack data structure that stores information about the active subroutines of an application. A call-stack may also be referred to as an execution stack, program stack, control stack, run-time stack, or machine stack. A call stack can be used for several related purposes. For example, a call stack can be used to track of the point to which each active subroutine of an application should return control when it finishes executing. An active subroutine is one that has been called, but is yet to complete execution, after which control should be handed back to the point of call. Such activations of subroutines may be nested to any level, hence the stack structure.

Figure 3:
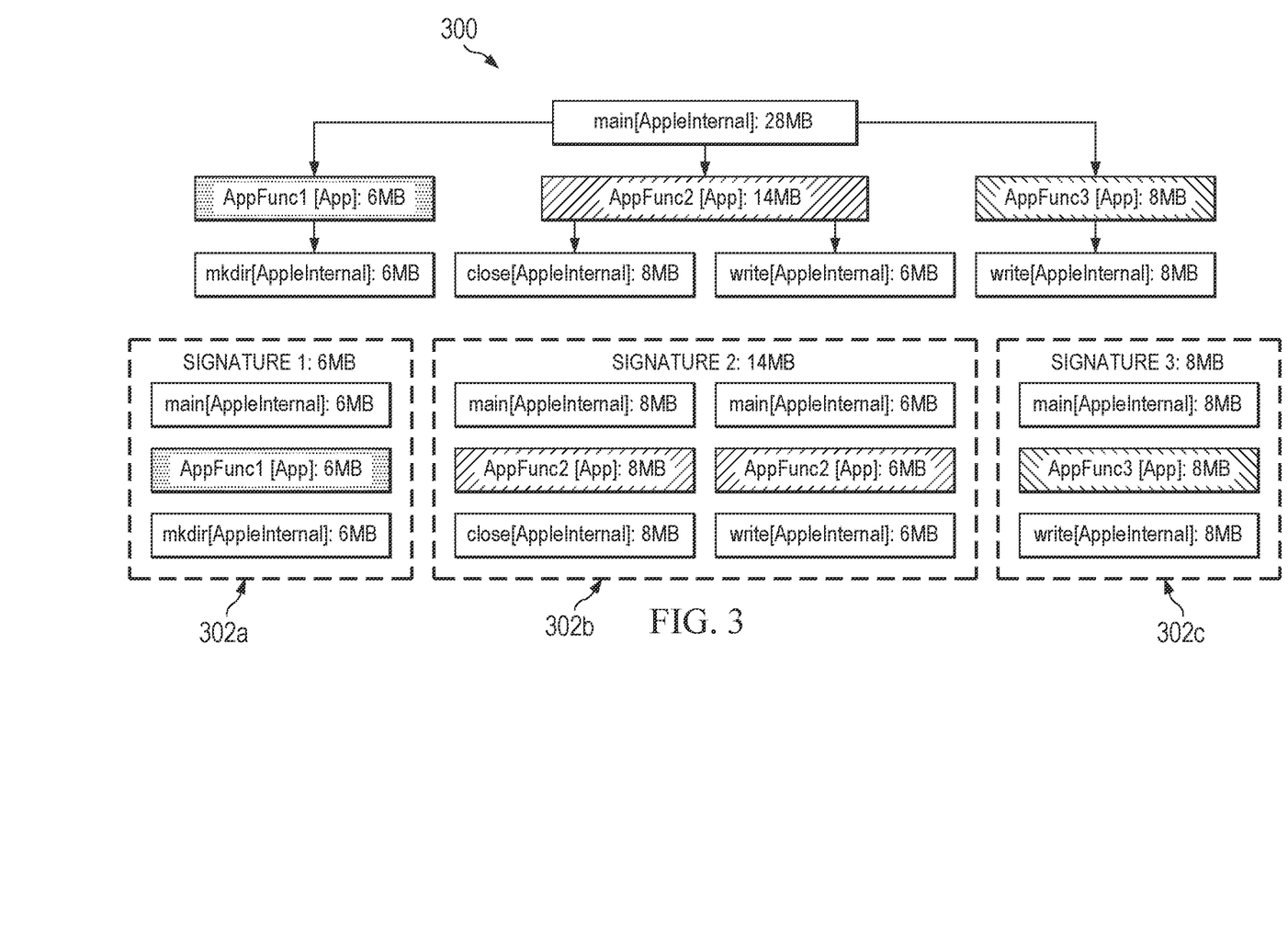
FIG. 3 shows a simplified call-stack.

For example, FIG. 3 shows a simplified call-stack 300 (also referred to as a call-stack tree). In this example, each of the branches of the call-stack 300 result in resource usage by an application (indicated by each of the lowest nodes of the call-stack 300).

The resource utilization analysis engine 150 can generate signatures representing the resource usage by the subroutines of the call-stack 300. For example, a first signature 302a can represent a first portion of the resource usage that is associated with a first portion of the call-stack 300 (e.g., a first call-path through a subset of the call-stack 300). As another example, a second signature 302b can represent a second portion of the resource usage that is associated with a second portion of the call-stack 300 (e.g., a second set of call-paths through a subset of the call-stack 300). As another example, a third signature 302c can represent a third portion of the resource usage that is associated with a third portion of the call-stack 300 (e.g., a third call-path through a subset of the call-stack 300).

In some implementations, signatures may differ across different versions of an application, even if the semantic meaning of those signature may remain the same. As an example, in first version of an application, a particular call-path (e.g., representing a certain portion of a call-stack) may be represented by a first signature. Further, in second version of the application, the same call-path may be represented by a second signature that is different than the first signature. Due to this difference, it may be difficult to directly compare the call-path—and its associated resource usage—across different versions of the application.

In some implementations, these differences in the signatures may be due to name mangling by a compiler during the compilation of the application. In general, name mangling (also referred to as name decoration) is a technique used by compilers to resolve unique names for programming entities in certain programming language. In some implementations, a compiler can perform name mangling by encoding additional information in the name of a function, structure, class or another datatype in order to pass more semantic information from the compiler to the linker.

As an example, in a first version of an application, a compiler may perform name mangling in a particular manner with respect to the subroutines of a call-stack (e.g., by encoding first information to the names of the subroutine). Further, in a second version of an application, the compiler may perform name mangling in a different manner with respect to the same subroutines of a call-stack (e.g., by encoding different second information to the names of the subroutine). Thus, when signatures are generated based on the call-paths, the signatures may differ, despite the signatures referring to the same subroutine.

In some implementations, the resource utilization analysis engine 150 can mitigate the effects of name mangling by selectively removing syntax from the call-paths and/or call-paths (and in the associated signatures) that are associated with name mangling. For example, the resource utilization analysis engine 150 can include a database of syntax (e.g., strings of text, frames, keywords, etc.) that are known to be added by compilers during a name mangling process. Upon determining that a call-path and/or call-path includes one or more of this syntax, the resource utilization analysis engine 150 can remove the syntax from the call-path and/or call-path (and from the associated signatures). Accordingly, the resource utilization analysis engine 150 can better match or "merge" signatures that are semantically similar to one another. Thus, the resource usage associated with those signatures are combined under a common signature, which more accurately reflects the resource usage patterns of an application (e.g., across different application versions).

In some implementations, these differences in the signatures may be due to changes in the underlying computer code that do not change the semantic meaning of the computer code (e.g., refactoring the computer code, use of indirection to reference something using a name, reference, or container instead of the value itself, etc.). For instance, a user may modify an input parameter to a particular subroutine from one data type to another (e.g., from signed integer to unsigned integer), without otherwise changing the semantic meaning of the subroutine. Thus, when signatures are generated based on the call-paths, the signatures may differ, despite the signatures having the same semantic meaning (e.g., referring to the same underlying call-path). As examples, these changes can include minor refactoring performed by the developers of the application, such as changing the name of a class to better reflect new use-cases, and introducing or removing a level of indirection to a call path, among others.

In some implementations, the resource utilization analysis engine 150 can mitigate the effects of these changes by performing fuzzy matching between signatures. For instance, the resource utilization analysis engine 150 can determine a degree of similarity (e.g., a similarity metric) between signatures based on one or more rules or criteria. If two or more signatures are sufficiently similar to one another (e.g., having a similarity metric that exceeds a particular threshold value), the resource utilization analysis engine 150 can match or "merge" the signatures, such that a common signature represents the same underlying semantic meaning. Accordingly, (e.g., such that the resource usage associated with those signatures are combined under a common signature). Thus, the resource usage associated with those signatures are combined under a common signature, which more accurately reflects the resource usage patterns of an application (e.g., across different application versions).

Various rules or criteria can be used to perform fuzzy matching. As an example, a rule or criteria can specify that two or more signatures are more likely to have the same semantic meaning (e.g., a higher similarity metric) if one or more differences between them represent an "unsymbolicated" frame associated with some or all of the signatures. In general, symbolication refers to a process of transforming an active memory address into a human readable format, such as method or function names, file names, line numbers, etc. An unsymbolicated frame refers to a portion of active memory address that has not been symbolicated. In some implementations, symbolication can be performed by matching each of the active memory address to a single name, set of line numbers, etc. (e.g., the name, set of line numbers, etc. that is the best match).

As another example, another rule or criteria can specify that two or more signatures are more likely to have the same semantic meaning (e.g., a higher similarity metric) if one or more differences between them represent a variation or different in compilation name mangling associated with the signatures.

As another example, another rule or criteria can specify that two or more signatures are more likely to have the same semantic meaning (e.g., a higher similarity metric) if one or more differences between them represent a difference in data type of one or more parameters of the signatures.

Although example rules or criteria are described herein, other rules or criteria also can be used, either instead or in addition to those described here.

In some implementations, the resource utilization analysis engine 150 can sort resource usage associated with each signature (e.g., according to priority or importance), and present the sorted resource usage to a user using a user interface. For example, the resource utilization analysis engine 150 can present a list of one or more display of signatures, sorted by the degree of resource usage associated with each of the signatures (e.g., such that a user can prioritize diagnosing and/or correcting any regressions associated with that signature).

In some implementations, the resource utilization analysis engine 150 can sort resource usage associated with each signature according to one or more weights or metrics to provide gain insights regarding how the resource usage varies across version identifiers within the same application.

For example, for each of the signatures, the resource utilization analysis engine 150 can determine a first weight or metric:

$$M_1 = W/N, \qquad \text{(Eq. 1)}$$

where $M_1$ is the first weight or metric, W is the number of samples in the diagnostic data corresponding to the signature, and N is the number of logs that contain information regarding the signature.

As another example, for each of the signatures, the resource utilization analysis engine 150 can determine a second weight or metric:

$$M_2 = N/M, \qquad \text{(Eq. 2)}$$

where $M_2$ is the second weight or metric, N is the number of logs that contain information regarding the signature, and M is the number of logs (e.g., logs for a particular version of an application).

In general, the first metric $M_1$ indicates the average resource usage by a given signature, and the second metric $M_2$ indicates pervasiveness which corresponds to how pervasive the signature is in a given version. The first metric $M_1$ is useful in identifying the regression that a diagnostic data may have when compared across versions. Further, the second metric $M_2$ is useful in determining whether more end-users are facing an issue due to a particular signature across versions.

Other weights and/or metrics also can be used, either instead of or in addition to those described herein.

In general, the diagnostic data 170 and/or the data generated by the resource utilization analysis engine 150 can be embodied as one or more data structures. In general, a data structure can refer to the arrangement or format of data that is generated, stored, and/or modified by a computer system. As an example, a data structure can include a particular arrangement of data fields, each storing a particular type of data. Further, a data structure can include data labels identifying one or more of the data fields (e.g., identifying the type of data stored in each of the data fields, a context or description of the data stored in each of the data fields, etc.).

In some implementations, a data structure can have a linear arrangement. For example, a data structure can include one or more arrays (e.g., a collection of data elements, each identified by a respective index or key). As another example, a data structure can include one or more linked lists (e.g., a collection of data elements in which element points to the next element in the linked list). As another example, data structure can include one or more data vectors having any number of dimensions (e.g., one, two, three, four, or more dimensions), each representing a different characteristic or parameter.

In some implementations, a data structure can have a hierarchical arrangement. For example, a data structure can include one or more hierarchical data trees).

In some implementations, a data can have other arrangements, such as a graph-based arrangement or a hash-based arrangement.

Although example data structures are described above, these are merely illustrative examples. In practice, computer systems can use any other data structure to process data, either instead or in addition to those described above.

In general, each of the computer systems 102 and electronic devices 104a-104n can include any number of devices that are configured to receive, process, and transmit data. Examples of the computer systems and/or electronic devices include client computing devices (e.g., desktop computers or notebook computers), server computing devices (e.g., server computers or cloud computing systems), mobile computing devices (e.g., cellular phones, smartphones, tablets, personal data assistants, notebook computers with networking capability), wearable computing devices (e.g., smart phones or headsets), and other computing devices capable of receiving, processing, and transmitting data. In some implementations, the computer systems can include computing devices that operate using one or more operating systems (e.g., Microsoft Windows, Apple macOS, Linux, Unix, Google Android, and Apple iOS, among others) and one or more architectures (e.g., x86, PowerPC, and ARM, among others). In some implementations, one or more of the computer systems and/or electronic devices need not be located locally with respect to the rest of the system 100, and one or more of the computer systems and/or electronic devices can be located in one or more remote physical locations.

Each the computer systems 102 and the electronic devices 104a-104n can include a respective user interface that enables users interact with the computer systems and/or electronic devices, other computer systems and/or electronic devices, and/or the resource utilization analysis engine 150. Example interactions include viewing data, transmit data from one computer system and/or electronic device to another, and/or issuing commands to a computer system and/or electronic device. Commands can include, for example, any user instruction to one or more of the computer system and/or electronic device to perform particular operations or tasks. In some implementations, a user can install a software application onto one or more of the computer systems and/or electronic devices to facilitate performance of these tasks.

In FIG. 1, the computer systems 102 and the electronic devices 104a-104n are illustrated as respective single components. However, in practice, the computer systems 102 and the electronic devices 104a-104n can be implemented on one or more devices (e.g., each computing device and/or electronic device including at least one processor such as a microprocessor or microcontroller). As an example, the computer system 102 can be a single computing device that is connected to the network 106, and the resource utilization analysis engine 150 can be maintained and operated on the single computing device. As another example, the computer system 102 can include multiple computing devices that are connected to the network 106, and t the resource utilization analysis engine 150 can be maintained and operated on some or all of the computing devices. For instance, the computer system 102 can include several computing devices, and the resource utilization analysis engine 150 can be distributed on one or more of these computing devices.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

Example Implementations

Example implementations are described in further detail below.

Overview:

In general, a system can be configured to provide trending insights for a signature (e.g., call-path signature) across versions of an application. To obtain reliably compare signatures across versions, the system can programmatically remove compiler introduced components that do not change the semantic meaning of the signature. Further, the system can take into account the occurrence of occasional unsymbolicated frames that can lead to two same signatures being treated differently. Further still, the system can also perform fuzzy matching logic so that the system is resilient to minor refactoring by developers of the applications, such that the signatures can be compared across versions with high accuracy and/or precision.

Diagnostic Data:

In this example, let us consider that the diagnostic data is related to the number of writes performed by an application on a storage device. Here, we consider that such a diagnostic data is received from devices after every 10 MB of writes, and the process call-stacks are sampled and stored.

Figure 4:
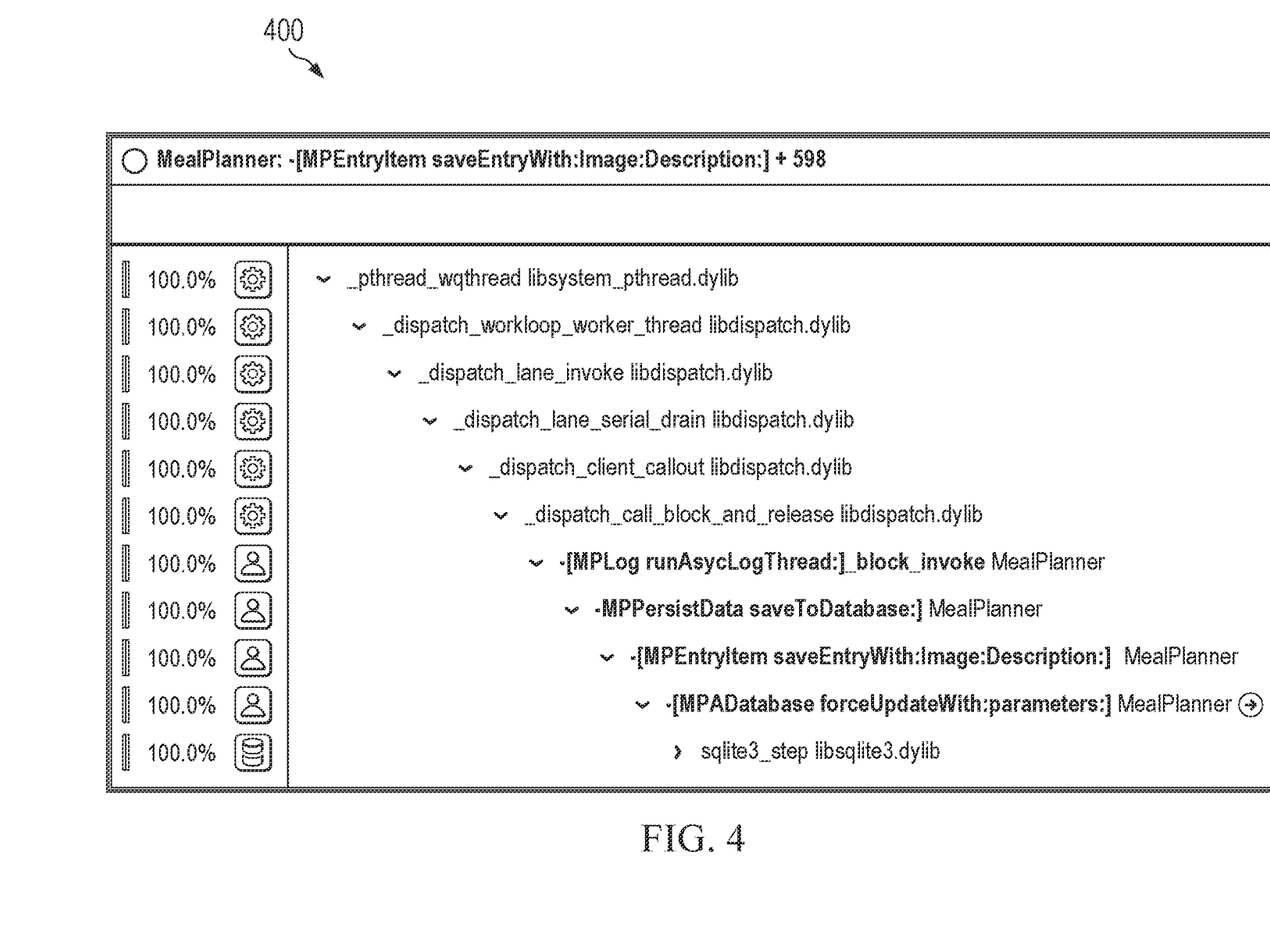
FIG. 4 shows an example log.

When a given application crosses specific thresholds (1 GB, 4 GB, 16 GB, etc.) in a day, the call-stacks are aggregated, saved as report file, and transmitted to a collection server (e.g., a resource utilization analysis engine). A sample log 400 is shown in FIG. 4.

Figure 5:
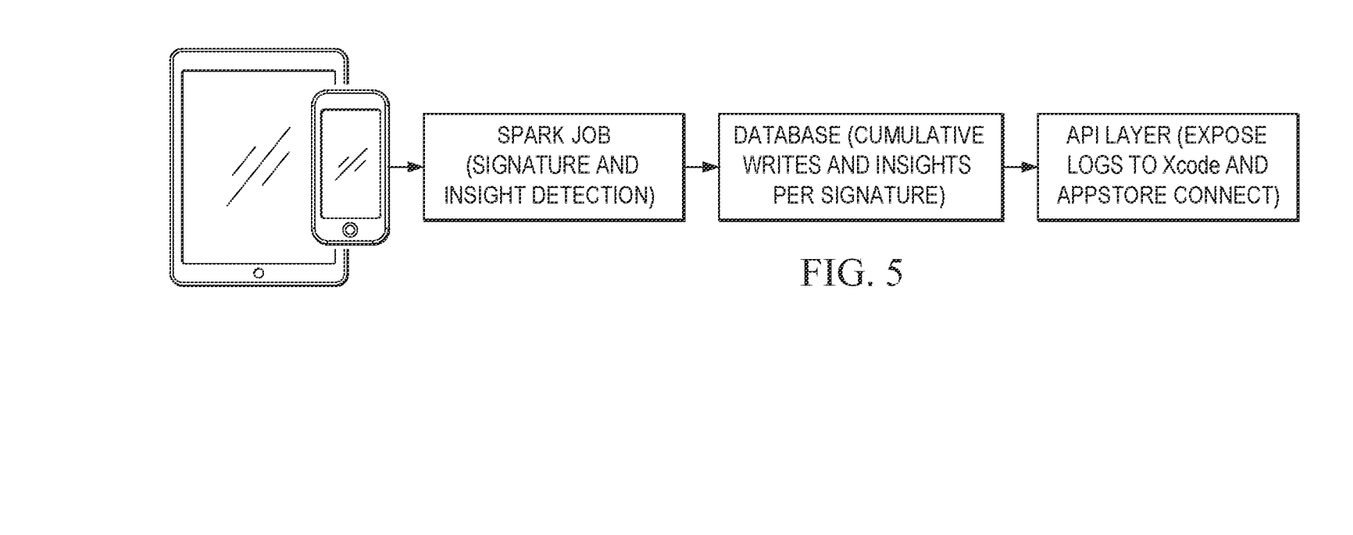
FIG. 5 shows an example process for processing diagnostic data.

Backend Processing:

In this example, diagnostic data are processed in real time (e.g., using a real time spark backend job), as such as FIG. 5. The tree-like structure of the diagnostic data is broken up into individual call-paths. Further, specific library calls (e.g., library calls provided by Apple, Inc., Cupertino, CA) are filtered in the call-path. The remaining functions are used as the signatures (e.g., such that the diagnostic data is bucketized into specific types).

As shown in FIG. 5, the diagnostic data is tracked in a cumulative manner for a given signature across all of the diagnostic logs represented in the full set of diagnostic data. Further, the diagnostic data can be provided to third parties (e.g., via an Application Programming Interface layer and/or any other tooling).

Figure 6:
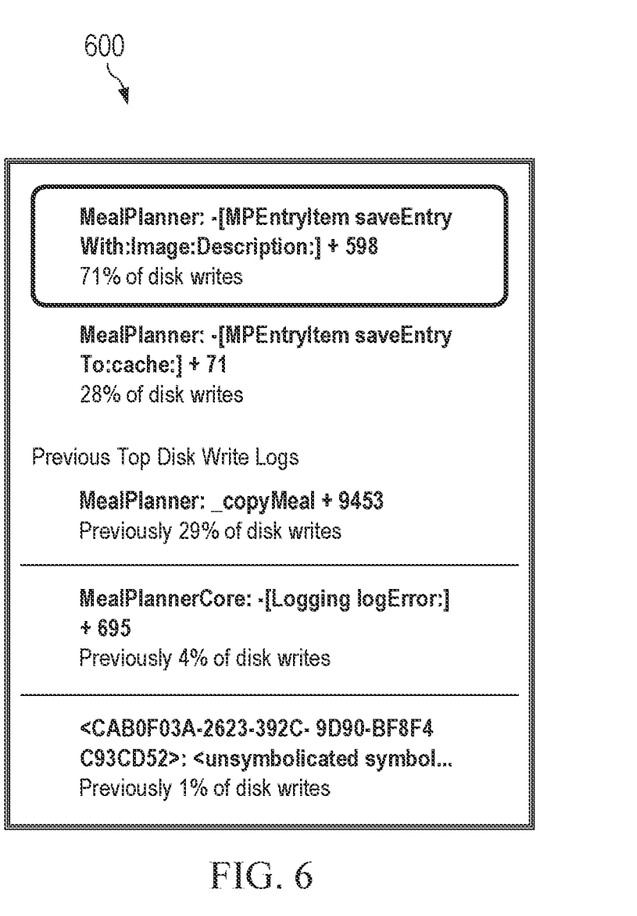
FIG. 6 example signatures for an application.

FIG. 6 shows an example signatures 600 for an application "MealPlanner," with the observed disk usage associated with each of the signatures 600.

Example Signature Analysis Techniques:

In this example, the system surfaces the top function call stack signatures from a particular application and a version of that application that are causing excessive disk writes (e.g., via Xcode Organizer). This helps the developers to prioritize fixing the signatures that have high write impact.

Example Metrics

As described above, the signatures can be sorted by different weights and/or metrics.

For example, the signatures can be sorted by a first metric $M_1$, as described above. This metric can be particularly beneficial, for example, in determining if a signature has regressed across different versions of an application.

As another example, the signatures can be sorted by a second metric $M_2$, as also described above. This metric can be particularly beneficial, for example, in defining how pervasive a signature is (e.g., if more users are facing high disk writes issue due to this signature as compared to before).

Example Semantic Matching

As described above, signatures can be matched or merged with one another based on a semantic matching process.

For example, in some implementations, signature indicate the set of method calls that eventually led to a write. In case of symbolicated third party frames, these signatures can contain both the third party methods which eventually invoked first party methods and/or system calls that cause disk writes. Further, compilers may introduce additional frames and/or keywords in order to add extra information about a function (also referred to as "name mangling"). Such compiler name mangling does not change the semantic meaning of the signature that ended up causing a write. In general, there are certain common frames that are intercepted by the compiler which adds additional information to the signature, but does not change its semantic meaning. Some of the examples of additional frames that are added by compiler are one-time initialization function for singleton, thunk for @callee_guaranteed ( )-> (@error@owned Error), among others.

Similarly, some of the examples of additional keywords that are added are (i) closure #1 in which defines the closure that the function is part of, (ii) _28-[MPLog runAsyncLogThread:]_block_invoke_2 which adds the length of the function appended in the prefix and a block number which defines the block that contained the function. As these name mangling concepts vary from compiler to compiler and also may change due to compiler optimizations, the system strips the signature of such frames and/or keywords that do not change its semantic meaning.

These compiler name mangling can also be result of developer introduced minor refactoring from version to version. For example, a different block may be introduced in the next version which can cause the _block_invoke number to change. Hence, the system can identify such frames and/or keywords that are exhaustive and void the signatures of them so that the signatures does not change drastically across versions.

Further, as the system is configured to notify developers when a regression actually introduced or exacerbated, the system can be configured to clean the signatures such that the resultant signature is impervious to (or otherwise is resilient against) developer-introduced minor refactoring and compiler optimization. As part of semantic matching, the system can also ignore the return types of the methods, as the methods cannot be overloaded with a mere change in return types in most high level programming languages. For a method to be overloaded, there must be different types and/or number of formal parameters, irrespective of the return type.

Example Fuzzy Matching

In some cases, semantic matching may not be sufficient to ensure that the same signature definition is preserved across versions of an application. This may be because minor refactoring performed by developers can also induce minor changes in the types of formal parameters, minor changes in method names, symbolication errors, and so on.

As an illustrative example, the following two signatures correspond to an application com.apple.MealPlanner:

3.6.1,
-[MPLog runAsyncLogThread:]==-[MPPersistData saveToDatabase]==-[MPEntryItem saveEntryWith:Image:Description:]==-[MPADatabase forceUpdateWith:parameters:]
3.4.1,
-[MPLog runAsyncLogThread:]==-[MPPersistData -continued

```
saveToDatabase]==MealPlanner+1952164==-[MPADatabase
forceUpdateWith:parameters:]
```

In this example, 3.6.1 and 3.4.1 are the application version identifiers, followed by the signature. Here, both of the signatures have the same semantic meaning. However, due to an unsymbolicated frame in version 3.4.1, they may be treated differently if a matching were to be performed based on exact matches between signatures.

As another illustrative example, the following two signatures correspond to an application com.apple.Fruta:

```
2.0.0,
==___initialize__daemon(void)==syncExistingStates(state__id,
context__db)==flush__to__sqlite(state__id, context__db, int,
unsigned long)
1.0.0,
==___initialize__daemon(void)==syncExistingStates(state__id,
context__db)==flush__to__sqlite(state__id, context__db, unsigned
int, unsigned long)
```

In this example, 2.0.0 and 1.0.0 are the application version identifiers, followed by the signature. One of the formal parameters was changed from unsigned int to int from version 1.0.0 and 2.0.0.

As another illustrative example, the following two signatures correspond to an application com.apple.MealPlanner:

```
3.6.1
-[MPLog runAsyncLogThread:]==-[MPPersistData
saveToDatabase]==-[MPEntryItem
saveEntryWith:Image:Description:]==-[MPADatabase
forceUpdateWith:parameters:]
3.7.1
-[MPLog runAsyncLogThread:]==-[MPLog
checkLoggingEnabled:]==-[MPPersistData saveToDatabase]==-
[MPEntryItem saveEntryWith:Image:Description:]==-
[MPADatabase forceUpdateWith:parameters:]
```

In this example, 3.6.1 and 3.7.1 are the application version identifiers, followed by the signature. The difference between the signatures is due to the use of indirection in the underlying computer code.

As another illustrative example, the following two signatures correspond to an application com.apple.Fruta:

```
2.0.0
==___initialize__daemon(void)==syncExistingStates(state__id,
context__db)==flush__to__sqlite(state__id, context__db, int,
unsigned long)
3.0.0
==___initialize__daemon(void)==syncExistingStates(state__id,
context__db)==flush__to__sqlite__wal(state__id, context__db, int,
unsigned long)
```

In this example, 2.0.0 and 3.0.0 are the application version identifiers, followed by the signature. The difference between the signatures is due to a minor refactoring of the underlying computer code (e.g., the addition of write-ahead logging (WAL)) that does not fundamentally change the semantic meaning of the code.

The system can include one or more criteria or rules to fuzzy match signatures across version (e.g., to account for the example scenarios above, among others), and return a score which indicates how closely two signatures match.

Example Processes

Figure 7:
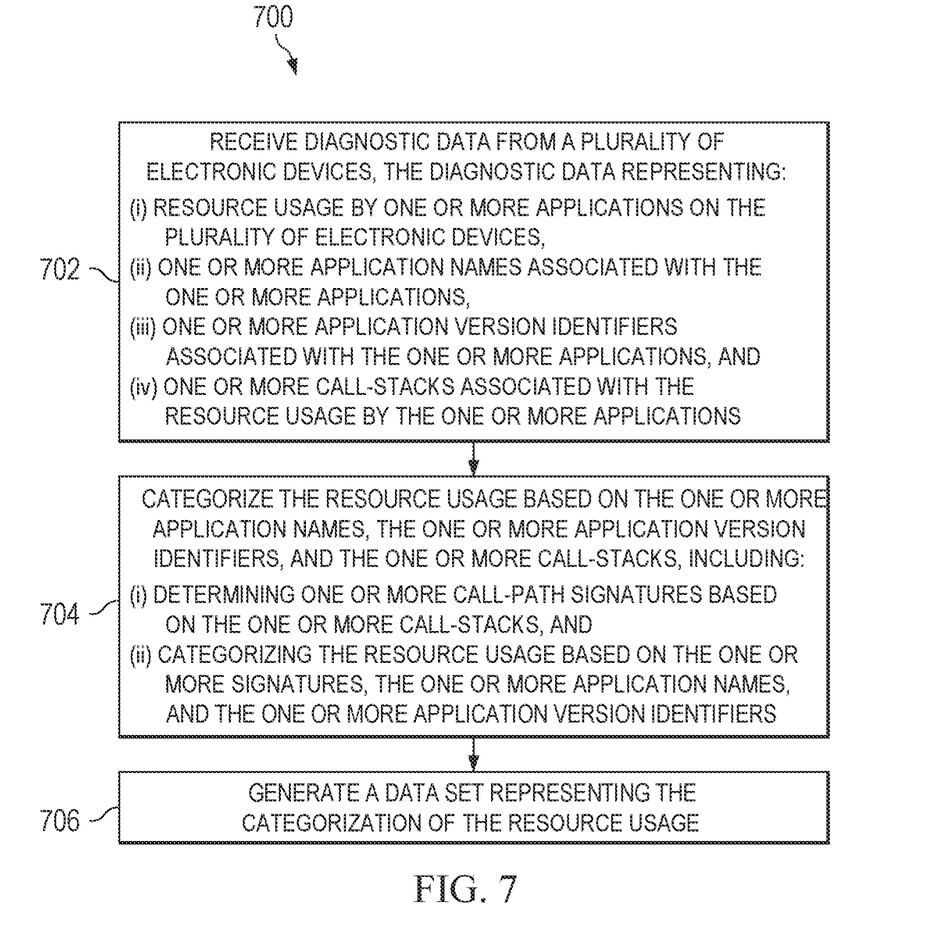
FIG. 7 is a diagram of an example process for analyzing resource usage by applications of an electronic device.

FIG. 7 shows an example process 700 for analyzing resource usage by applications of an electronic device. In some implementations, the process 700 can be performed by the system 100 described in this disclosure (for example, the system 100 including the resource utilization analysis engine 150 shown and described with reference to FIG. 1) using one or more processors (for example, using the processor or processors 810 shown in FIG. 8).

In the process 700, a computer system receives diagnostic data from a plurality of electronic devices (block 702). The diagnostic data represents at least resource usage by one or more applications on the plurality of electronic devices, one or more application names associated with the one or more applications, one or more application version identifiers associated with the one or more applications, and one or more call-stacks associated with the resource usage by the one or more applications. In some implementations, the diagnostic data can also represent an application name of each of the one or more applications.

In some implementations, the resource usage can include writing data to a storage device on each of the plurality of electronic devices, utilization of one or more processors on each of the plurality of electronic devices, utilization of computer memory on each of the plurality of electronic devices, utilization of electrical power by each of the plurality of electronic devices, an execution failure by the one or more applications on the plurality of electronic devices, and/or any combination thereof.

The computer system categorizes the resource usage based on the one or more application names, the one or more application version identifiers, and the one or more call-stacks (block 704). Categorizing the resource usage includes determining one or more signatures based on the one or more call-stacks, and categorizing the resource usage based on the one or more signatures, the one or more application names, and the one or more application version identifiers.

In some implementations, categorizing the resource usage can further include determining one or more call-paths based on the one or more call-stacks, and determining the one or more signatures based on the one or more call-paths.

In some implementations, the resource usage can be categorized based on semantic matching. For example, categorizing the resource usage can include determining a plurality of call-paths based on the one or more call-stacks, determining a plurality of signatures based on the one or more call-paths, performing semantic matching with respect to the plurality of signatures, and categorizing the resource usage based on the semantically matched signatures.

In some implementations, performing semantic matching with respect to the plurality of signatures can include removing one or more portions of the plurality of signatures, where the one or more portions of the signature represent syntax added to the plurality of call-paths by a compiler during a compilation of the one or more applications, and subsequent to removing the syntax, determining a similarity among the signatures.

In some implementations, performing semantic matching with respect to the plurality of signatures can also include, upon determining a similarity between a first signature and a second signature, merging the first signature and the second signature.

In some implementations, the syntax is associated with a name mangling process by the compiler.

In some implementations, the resource usage can be categorized based on fuzzy matching. For example, categorizing the resource usage can include determining a plurality of call-based on in the one or more call-stacks, determining a plurality of signatures based on the one or more call-paths, performing fuzzy matching with respect to the plurality of signatures, and categorizing the resource usage based on the fuzzy matched signatures.

In some implementations, performing fuzzy matching with respect to the plurality of signatures can include determining one or more differences between a first signature and a second signature, and determining whether the one or more differences satisfy one or more criteria. The one or more criteria can include at least one of: (i) a first criteria that the one or more differences represent an unsymbolicated frame associated with at least one of the first signature or the second signature, (ii) a second criteria that the one or more differences represent a variation in compilation name mangling associated with the first signature and the second signature, (iii) a third criteria that the one or more differences represent a difference in data type of one or more parameters of the first signature and the second signature, (iv) a fourth criteria that the one or more differences represent an indirection in computer code associated with at least one of the first signature and the second signature, and/or (v) a fifth criteria that the one or more differences represent a refactoring of computer code associated with at least one of the first signature and the second signature. Further, a similarity metric can be determined for the first signature and the second signature based on at least one of the one or more criteria.

In some implementations performing fuzzy matching with respect to the plurality of signatures can also include, upon determining the similarity metric satisfies a similarity threshold, merging the first signature and the second signature.

The computer system generates a data set representing the categorization of the resource usage (block 706).

In some implementations, the diagnostic data can include a plurality of logs received from plurality of electronic devices. Each of the logs can include one or more samples regarding the resource usage of the one or more applications on the plurality of electronic devices. Further, categorizing the resource usage can include, for each category of resource usage, determining a weight for that category based on: a number of samples in the diagnostic data that are associated with the signature of that category, and a number of diagnostic logs having the signature of that category.

In some implementations, the diagnostic data can include a plurality of logs received from plurality of electronic devices. Each of the logs can include one or more samples regarding the resource usage of the one or more applications on the plurality of electronic devices. Further, categorizing the resource usage can include, for each category of resource usage, determining a weight for that category based on: a number of diagnostic logs having the signature of that category, and a total number of diagnostic logs.

In some implementations, the process 700 can also include presenting at least a portion of the data set representing the categorization of the resource usage to a user.

Example Systems

Figure 8:
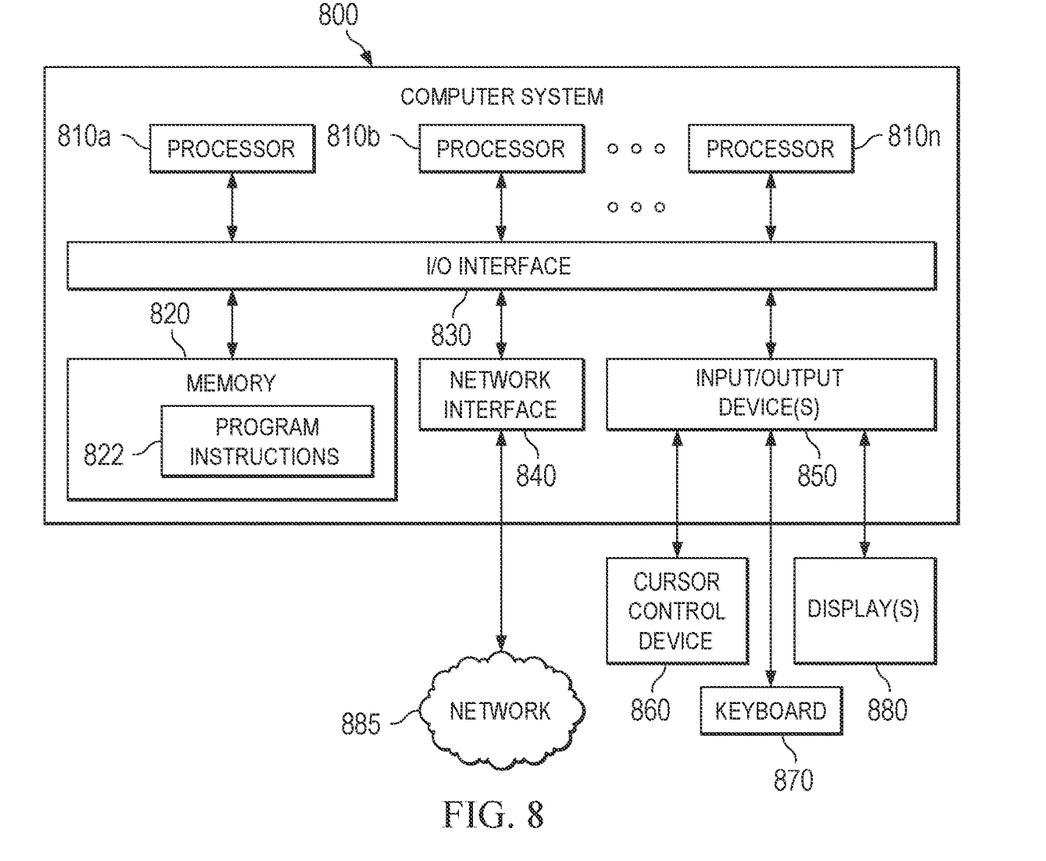
FIG. 8 is a diagram of an example computer system.

FIG. 8 illustrates an example computer system 800 that may implement the processing device 104 and/or any of the other components described herein, (e.g., any of the components described above with reference to FIGS. 1-7). The computer system 800 may be configured to execute any or all of the embodiments described above. In different embodiments, computer system 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

One or more of the embodiments described herein be executed in one or more computer systems 800, which may interact with various other devices. Note that any component, action, or functionality described above with respect to FIGS. 1-7 may be implemented on one or more computers configured as computer system 800 of FIG. 8, according to various embodiments. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store point cloud compression or point cloud decompression program instructions 822 and/or sensor data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions 822 may be configured to implement an image sensor control application incorporating any of the functionality described above. In some embodiments, program instructions and/or data may be received, sent or stored upon different types of computer-accessible media or on similar media separate from system memory 820 or computer system 800. While computer system 800 is described as implementing the functionality of functional blocks of previous Figures, any of the functionality described herein may be implemented via such a computer system.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network 885 (e.g., carrier or agent devices) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 822, which may be processor-executable to implement any element or action described above. In one embodiment, the program instructions may implement the methods described above. In other embodiments, different elements and data may be included. Note that data may include any data or information described above.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method comprising:
   receiving, by a computer system, diagnostic data comprising a plurality of diagnostic logs from a plurality of electronic devices, wherein the diagnostic data represents:
   resource usage by one or more applications on the plurality of electronic devices,
   one or more application names associated with the one or more applications,
   one or more application version identifiers associated with the one or more applications, and one or more call-stacks associated with the resource usage by the one or more applications;

categorizing, by the computer system, the resource usage based on the one or more application names, the one or more application version identifiers, and the one or more call-stacks, wherein categorizing the resource usage comprises:
   determining one or more signatures based on the one or more call-stacks, and
   categorizing the resource usage based on the one or more signatures, the one or more application names, and the one or more application version identifiers;

determining, for each category of resource usage, a weight for that category based on:
   a number of samples in the diagnostic data that are associated with the signature of that category, the samples representing the resource usage of the one or more applications on the plurality of electronic device
   at least one of (i) a number of diagnostic logs having the signature of that category or (ii) a total number of diagnostic logs; and generating, by the computer system, a data set representing the categorization of the resource usage and the weights.

2. The method of claim 1, wherein categorizing the resource usage further comprises:
   determining one or more call-paths based on the one or more call-stacks, and
   determining the one or more signatures based on the one or more call-paths.

3. The method of claim 1, wherein the resource usage comprises writing data to a storage device on each of the plurality of electronic devices.

4. The method of claim 1, wherein the resource usage comprises utilization of one or more processors on each of the plurality of electronic devices.

5. The method of claim 1, wherein the resource usage comprises utilization of computer memory on each of the plurality of electronic devices.

6. The method of claim 1, wherein the resource usage comprises utilization of electrical power by each of the plurality of electronic devices.

7. The method of claim 1, wherein the resource usage comprises an execution failure by the one or more applications on the plurality of electronic devices.

8. The method of claim 1, wherein categorizing the resource usage comprises:
   determining a plurality of call-paths based on the one or more call-stacks,
   determining a plurality of signatures based on one or more call-paths,
   performing semantic matching with respect to the plurality of signatures, and
   categorizing the resource usage based on the semantically matched signatures.

9. The method of claim 8, wherein performing semantic matching with respect to the plurality of signatures comprises:
   removing one or more portions of the plurality of signatures, where the one or more portions of the signature represent syntax added to the plurality of call-paths by a compiler during a compilation of the one or more applications, and
   subsequent to removing the syntax, determining a similarity among the signatures.

10. The method of claim 9, wherein performing semantic matching with respect to the plurality of signatures further comprises:
   upon determining a similarity between a first signature and a second signature, merging the first signature and the second signature.

11. The method of claim 9, wherein the syntax is associated with a name mangling process by the compiler.

12. The method of claim 1, wherein categorizing the resource usage comprises:
   determining a plurality of call-based on in the one or more call-stacks,
   determining a plurality of signatures based on one or more call-paths,
   performing fuzzy matching with respect to the plurality of signatures, and
   categorizing the resource usage based on the fuzzy matched signatures.

13. The method of claim 12, wherein performing fuzzy matching with respect to the plurality of signatures comprises:
   determining one or more differences between a first signature and a second signature,
   determining whether the one or more differences satisfy one or more criteria, wherein the one or more criteria comprises at least one of:
      a first criteria that the one or more differences represent an unsymbolicated frame associated with at least one of the first signature or the second signature,
      a second criteria that the one or more differences represent a variation in compilation name mangling associated with the first signature and the second signature,
      a third criteria that the one or more differences represent a difference in data type of one or more parameters of the first signature and the second signature;
      a fourth criteria that the one or more differences represent an indirection in computer code associated with at least one of the first signature and the second signature, or
      a fifth criteria that the one or more differences represent a refactoring of computer code associated with at least one of the first signature and the second signature, and
   determining a similarity metric for the first signature and the second signature based on at least one of the one or more criteria.

14. The method of claim 13, wherein performing fuzzy matching with respect to the plurality of signatures further comprises:
   upon determining the similarity metric satisfies a similarity threshold, merging the first signature and the second signature.

15. The method of claim 1, further comprising:
   presenting at least a portion of the data set representing the categorization of the resource usage to a user.

16. The method of claim 15, wherein presenting at least the portion of the data set representing the categorization of the resource usage to the user comprises:
   presenting a user interface to the user, wherein the user interface comprises a plurality of user interface elements, wherein each of the user interface element represents a respective portion of resource usage associated with a respective one of the signatures and a respective one of the one or more application version identifiers.

17. The method of claim 1, wherein, for each category of resource usage, the weight that category is determined based on:
the number of samples in the diagnostic data that are associated with the signature of that category, and
the number of diagnostic logs having the signature of that category.

18. The method of claim 1, wherein, for each category of resource usage, the weight that category is determined based on:
the number of samples in the diagnostic data that are associated with the signature of that category, and
the total number of diagnostic logs.

19. The method of claim 1, wherein for each category of resource usage, determining the weight for that category comprises:
determining a ratio of:
the number of samples in the diagnostic data that are associated with the signature of that category, and
at least one of (i) the number of diagnostic logs having the signature of that category or (ii) the total number of diagnostic logs.

20. A system, comprising:
at least one processor; and
a memory communicatively coupled to the at least one processor, the memory storing instructions which, when executed by the at least one processor, cause the at least one processor to perform operations comprising:
receiving diagnostic data comprising a plurality of diagnostic logs from a plurality of electronic devices, wherein the diagnostic data represents:
resource usage by one or more applications on the plurality of electronic devices,
one or more application names associated with the one or more applications,
one or more application version identifiers associated with the one or more applications, and
one or more call-stacks associated with the resource usage by the one or more applications;
categorizing the resource usage based on the one or more application names, the one or more application version identifiers, and the one or more call-stacks, wherein categorizing the resource usage comprises:
determining one or more signatures based on the one or more call-stacks, and
categorizing the resource usage based on the one or more signatures, the one or more application names, and the one or more application version identifiers;
determining, for each category of resource usage, a weight for that category based on:
a number of samples in the diagnostic data that are associated with the signature of that category, the samples representing the resource usage of the one or more applications on the plurality of electronic device
at least one of (i) a number of diagnostic logs having the signature of that category or (ii) a total number of diagnostic logs; and
generating a data set representing the categorization of the resource usage and the weights.

21. One or more non-transitory computer-readable media storing instructions which, when executed by at least one processor, cause the at least one processor to perform operations comprising:
receiving diagnostic data comprising a plurality of diagnostic logs from a plurality of electronic devices, wherein the diagnostic data represents:
resource usage by one or more applications on the plurality of electronic devices,
one or more application names associated with the one or more applications,
one or more application version identifiers associated with the one or more applications,
one or more call-stacks associated with the resource usage by the one or more applications; and
categorizing the resource usage based on the one or more application names, the one or more application version identifiers, and the one or more call-stacks, wherein categorizing the resource usage comprises:
determining one or more signatures based on the one or more call-stacks, and
categorizing the resource usage based on the one or more signatures, the one or more application names, and the one or more application version identifiers;
determining, for each category of resource usage, a weight for that category based on:
a number of samples in the diagnostic data that are associated with the signature of that category, the samples representing the resource usage of the one or more applications on the plurality of electronic device
at least one of (i) a number of diagnostic logs having the signature of that category or (ii) a total number of diagnostic logs; and
generating a data set representing the categorization of the resource usage and the weights.

* * * * *